Oct. 7, 1924.
R. BLUMBERG
EMERGENCY APPARATUS FOR DAMAGED SHIPS
Filed March 26, 1918 7 Sheets-Sheet 1
1,511,155
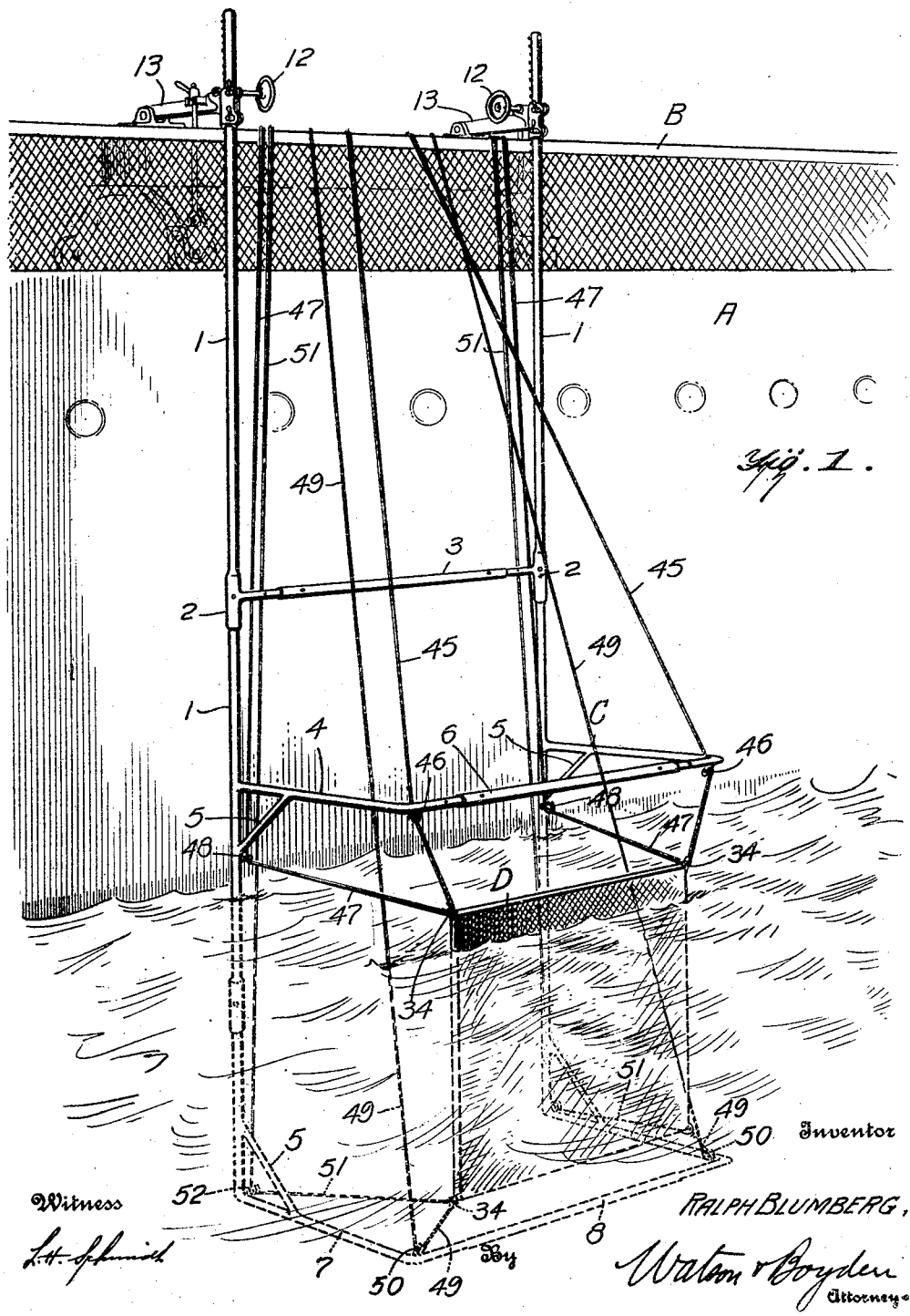

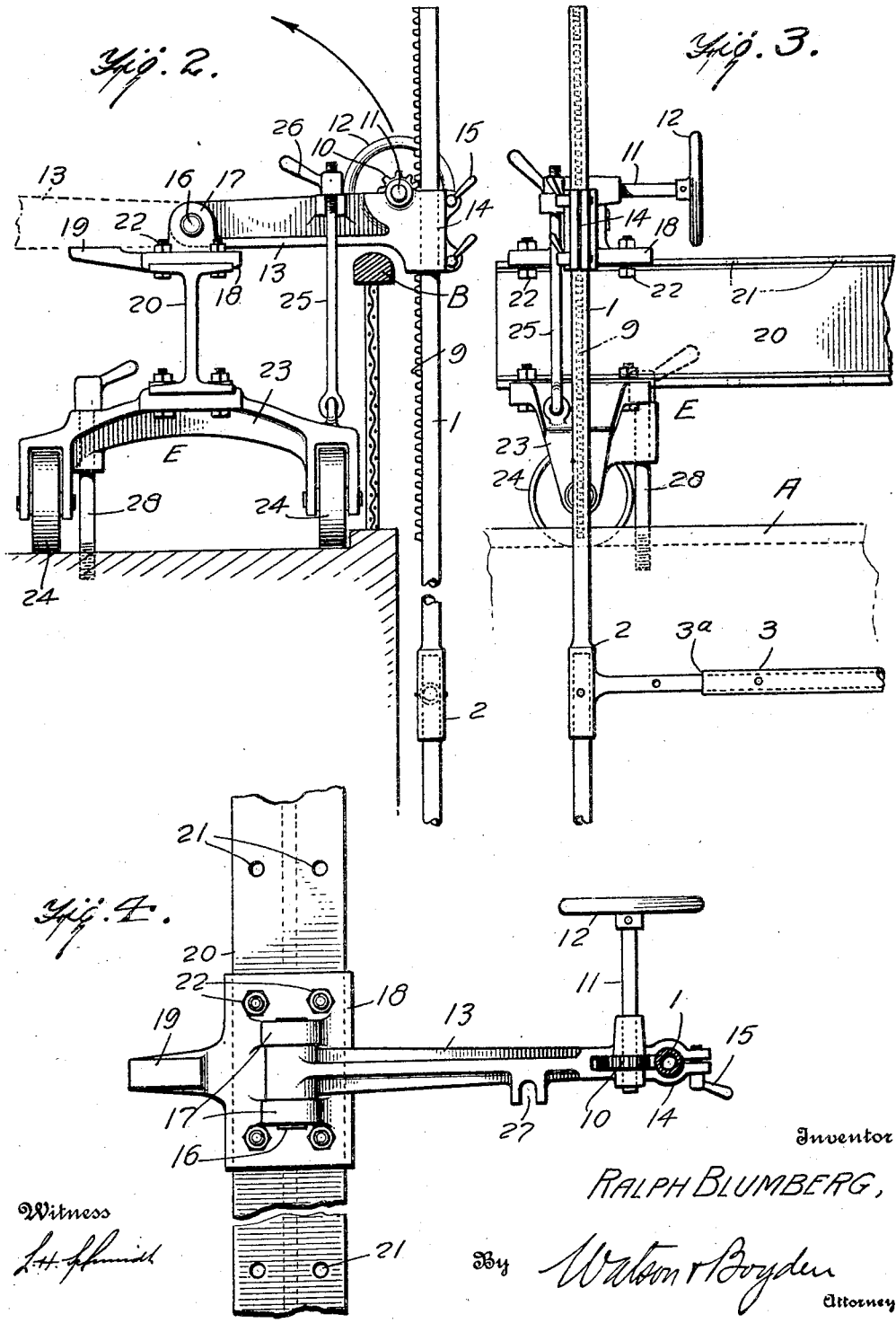

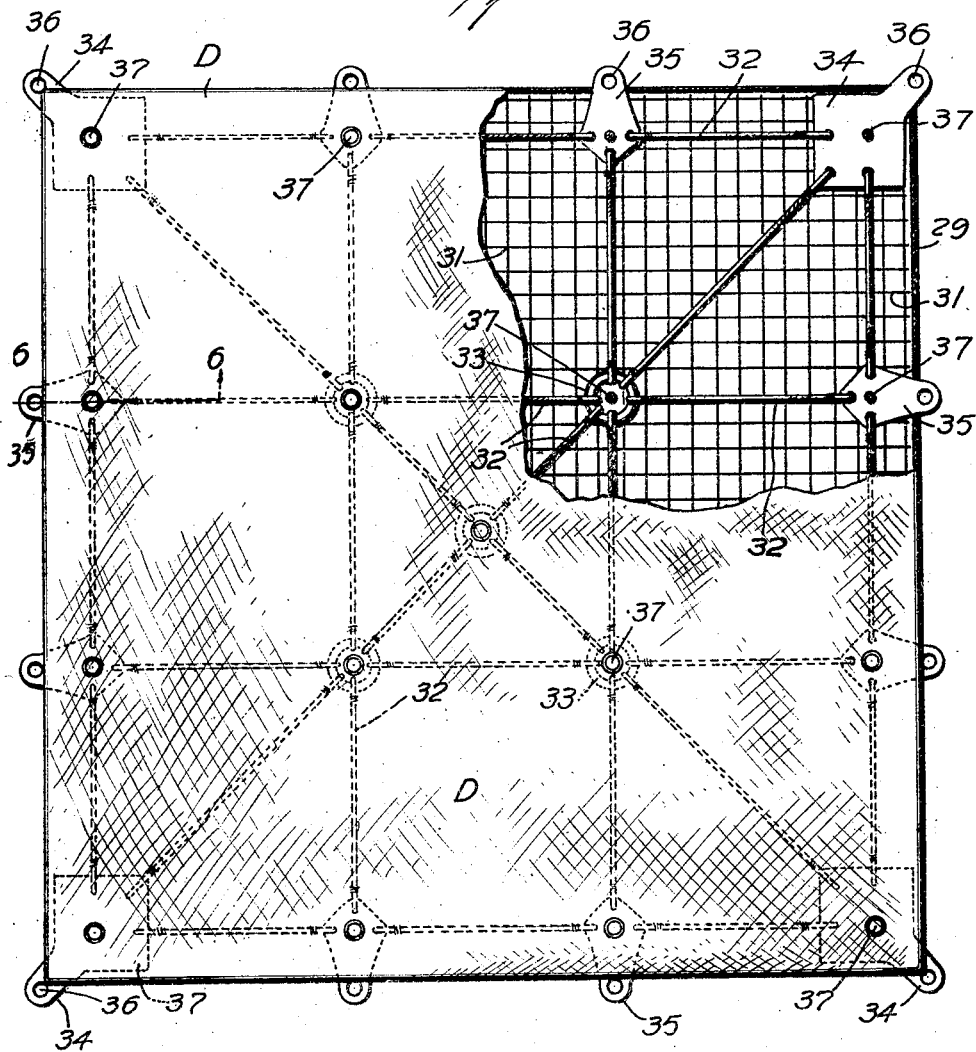
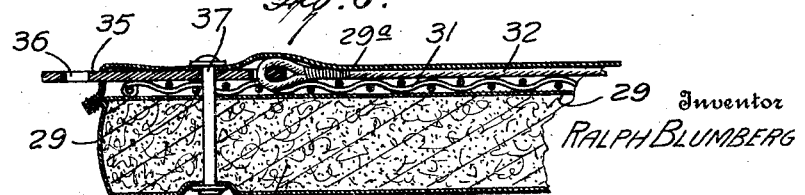

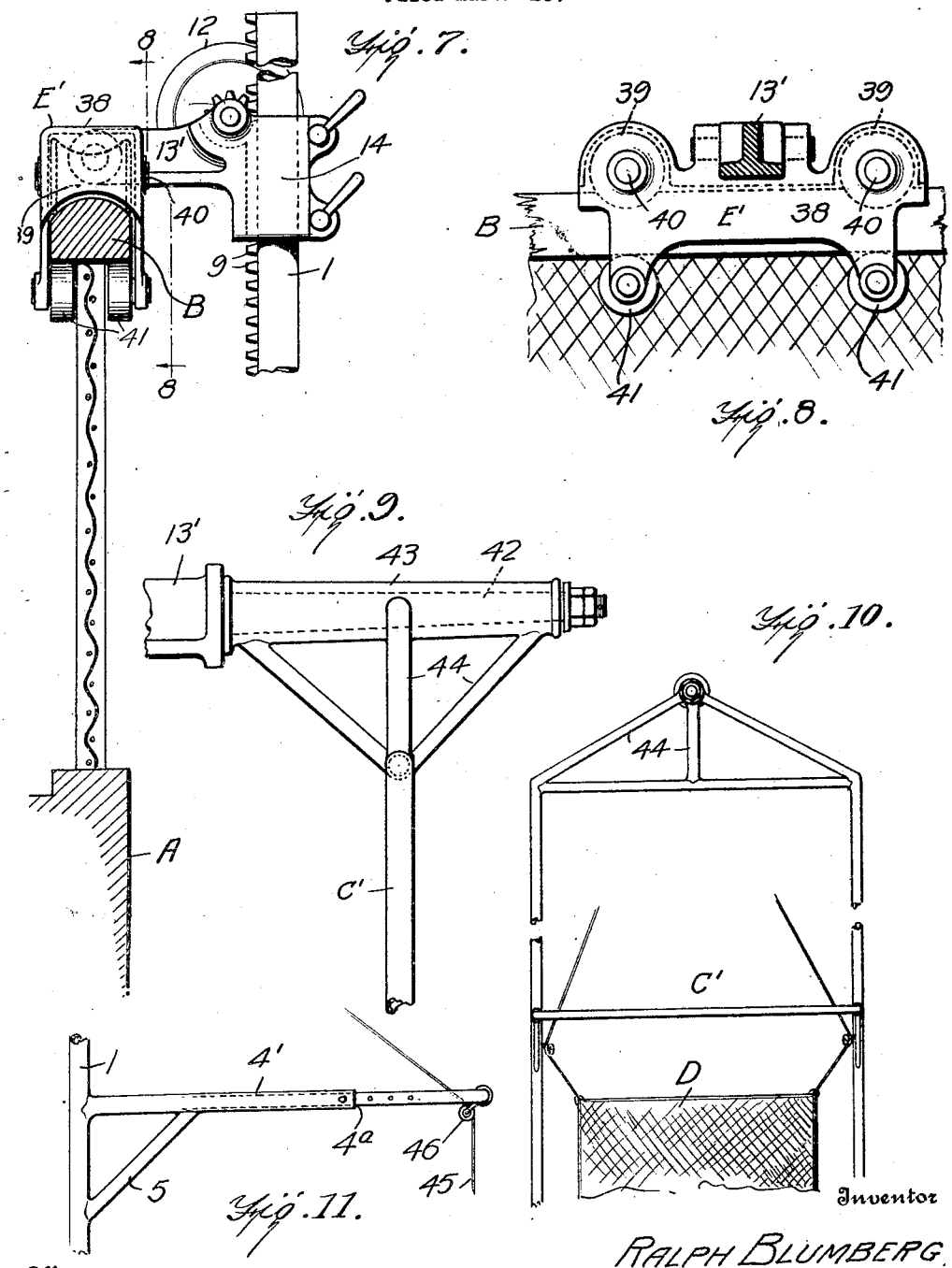

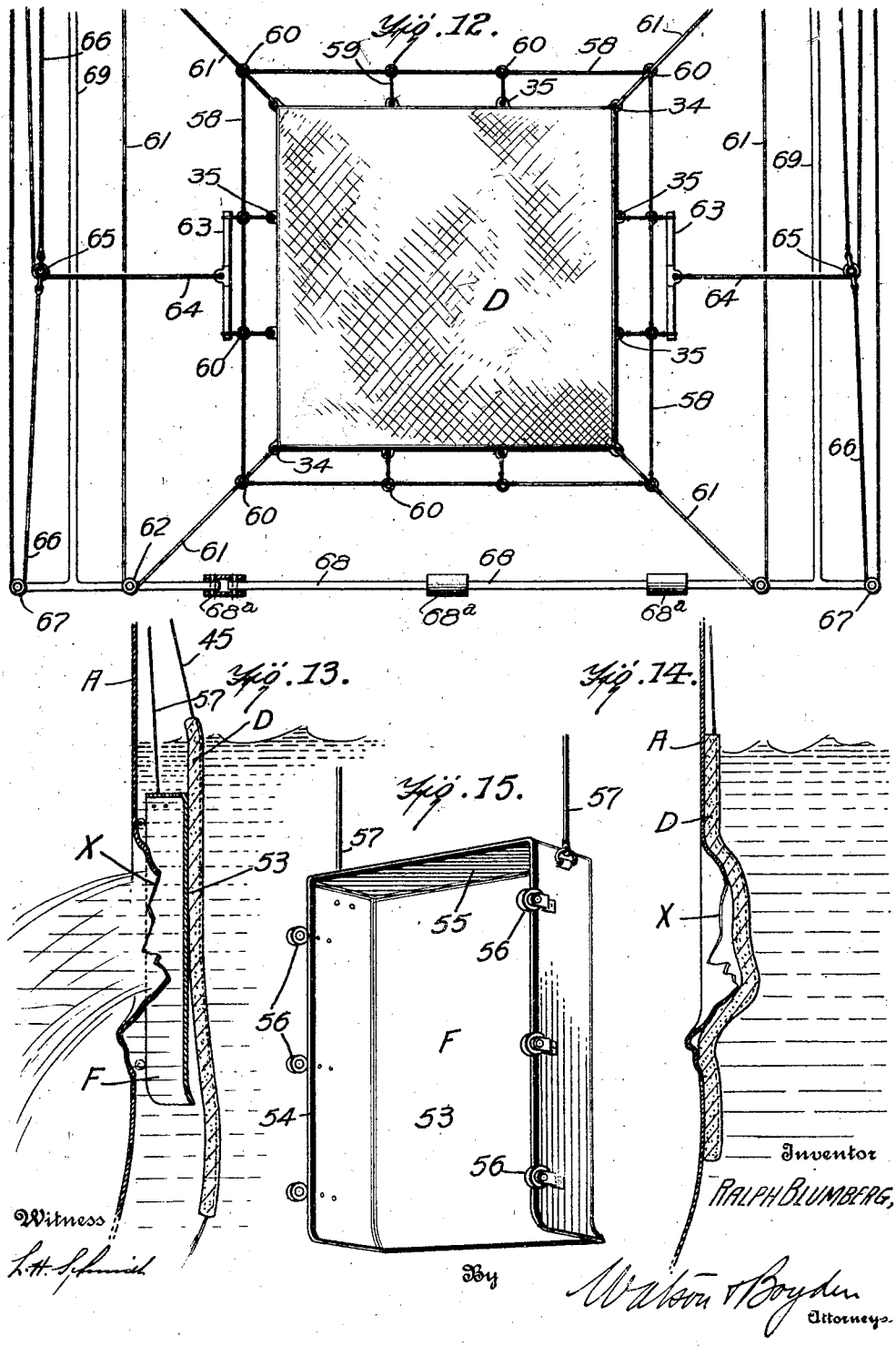

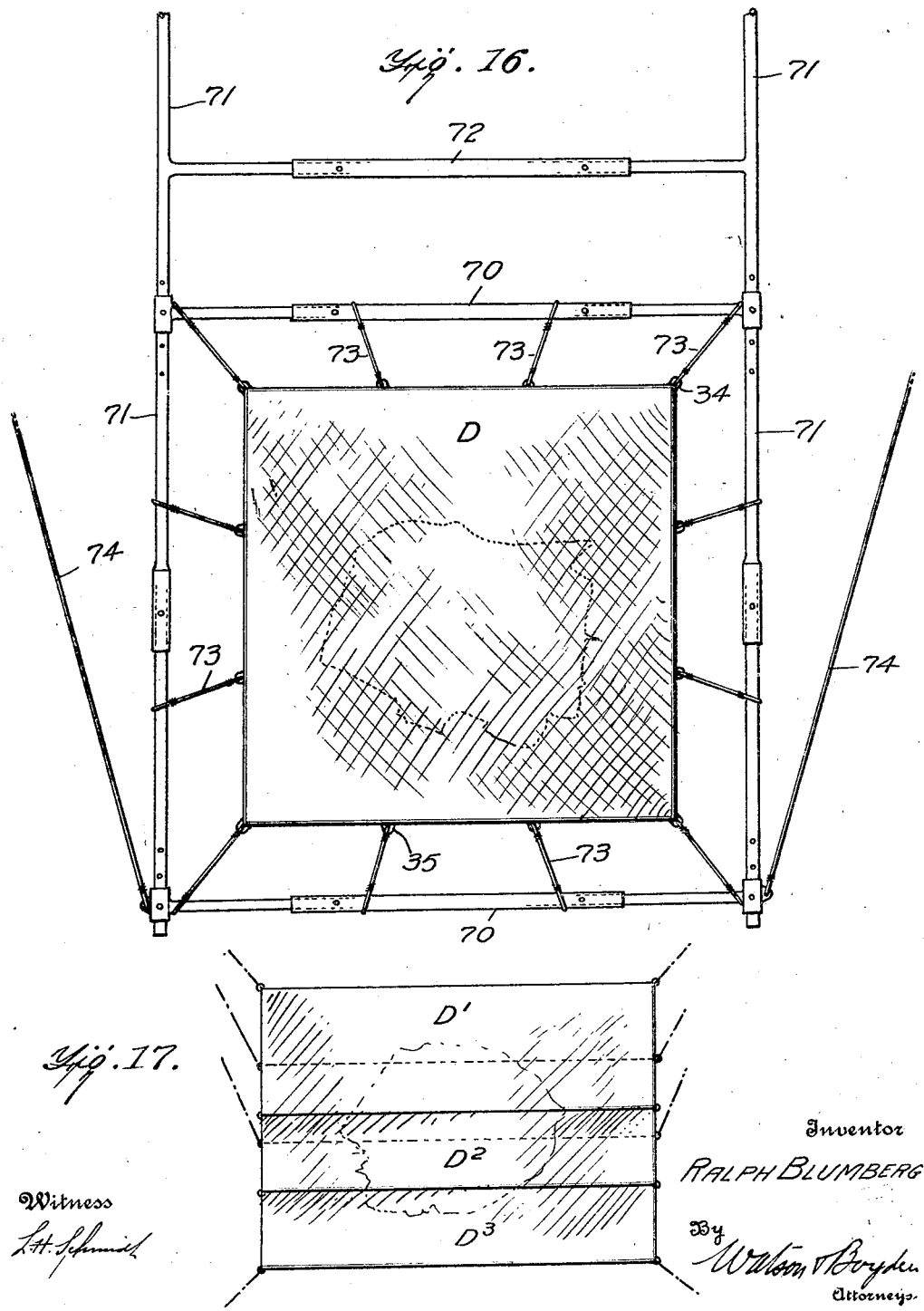

Oct. 7, 1924.
R. BLUMBERG
1,511,155
EMERGENCY APPARATUS FOR DAMAGED SHIPS
Filed March 26, 1918    7 Sheets-Sheet 7
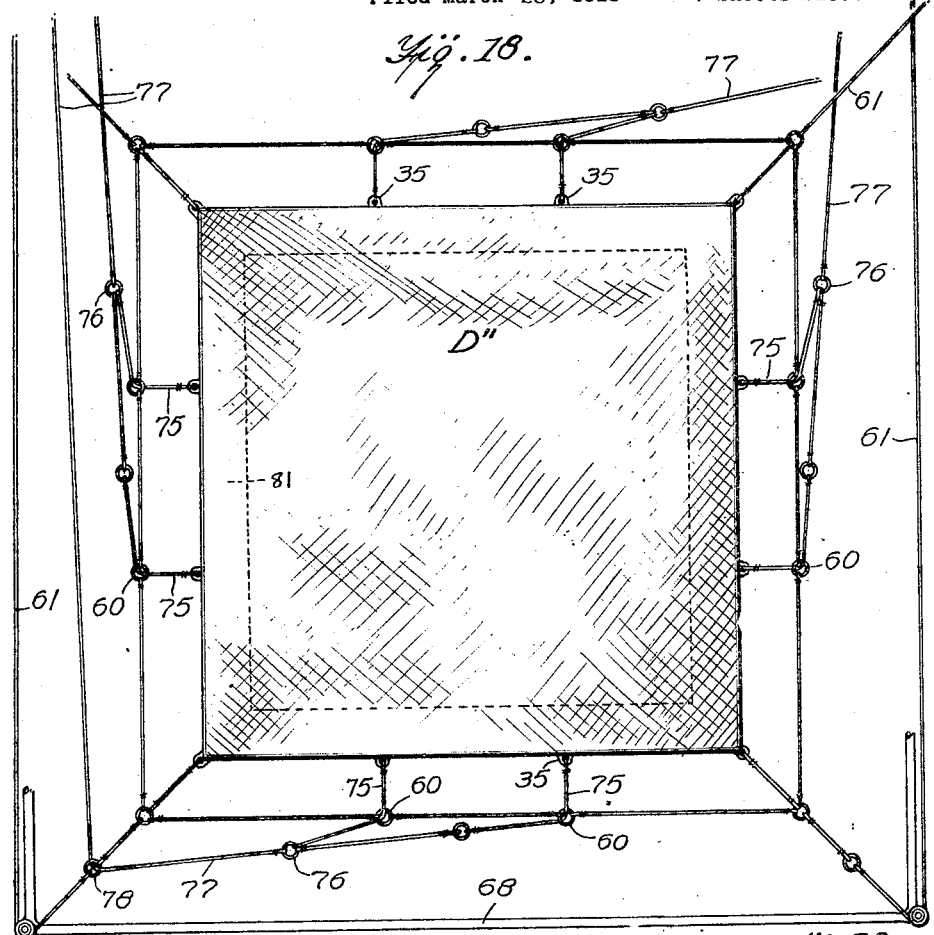
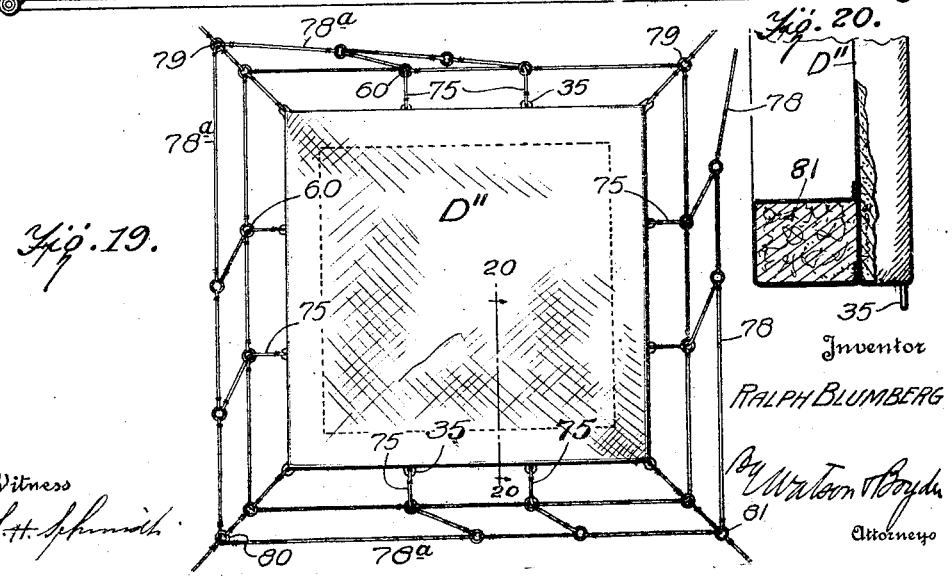

Patented Oct. 7, 1924.

1,511,155

UNITED STATES PATENT OFFICE.

RALPH BLUMBERG, OF BALTIMORE, MARYLAND.

EMERGENCY APPARATUS FOR DAMAGED SHIPS.

Application filed March 26, 1918. Serial No. 224,827.

*To all whom it may concern:*

Be it known that I, RALPH BLUMBERG, a citizen of the United States, residing at Baltimore, in the State of Maryland, have invented certain new and useful Improvements in Emergency Apparatus for Damaged Ships, of which the following is a specification.

This invention relates to emergency safety apparatus for temporarily stopping a rent in the hull of a ship caused by torpedo, collision, or other accident.

The objects of the invention are to provide apparatus of this kind so mounted on the deck or other suitable place that it may be quickly lowered into operative position upon the occurrence of a disaster, and readily manipulated so as to effectively prevent the ship from sinking, or, at least, very much retard the influx of water.

In order that the invention may be readily understood, reference is had to the accompanying drawings, forming part of this specification, and in which several different embodiments of the invention are illustrated.

In the drawings,

Fig. 1 is a perspective view of one form of my improved safety apparatus when in position for use;

Figs. 2, 3, and 4 are enlarged, fragmentary details showing respectively, an end elevation, a front elevation, and a plan, of one form of supporting and raising mechanism forming part of my invention;

Fig. 5 is an elevation, on an enlarged scale, showing an improved mattress which I propose to employ, parts being broken away;

Fig. 6 is a fragmentary section on the line 6—6 of Fig. 5;

Fig. 7 is an end elevation, similar to Fig. 2, but showing a modified construction;

Fig. 8 is a sectional elevation on the line 8—8 of Fig. 7;

Figs. 9 and 10 are a side elevation and a front elevation, respectively, of a still further modified construction of supporting device, Fig. 9 being on an enlarged scale;

Fig. 11 is a fragmentary side elevation of a part of the supporting frame hereinafter described;

Fig. 12 is a front elevation of another form of frame with means for supporting the mattress thereon;

Figs. 13 and 14 are conventional, vertical, sectional views showing a method for positioning the mattress over a rent, such method being different from that shown in Fig. 1;

Fig. 15 is a perspective view of the guard or shield shown in Fig. 13;

Fig. 16 is a front elevation of a further modified construction of frame, with a still different method of securing the mattress thereto;

Fig. 17 is a diagrammatic view illustrating how a number of mattresses can be combined;

Figs. 18 and 19 are views somewhat similar to Fig. 12, showing modified arrangements for positioning and tensioning the mattress; and, Fig. 20 is a fragmentary, sectional view showing a modified construction of mattress.

Referring to the drawings in detail, and more particularly to Figs. 1 to 6 thereof, A designates the hull of a ship, and B the usual railing surrounding one of the decks. I propose to provide a framework designated in its entirety by the reference character C, for supporting and lowering a suitable mattress D into position to cover a hole or rent formed in the hull. To this end, I further propose to mount the frame upon a suitable truck E, adapted to travel longitudinally of the deck, close to the railing so that the mattress may be moved to any desired point longitudinally of the ship.

The framework preferably consists of a pair of side members 1, formed in sections, such sections being united by means of couplings 2. The side members are suitably spaced by means of cross bars 3, which, as shown in Fig. 3, may be fitted with telescopic joints 3ª, so that the spacing may be varied, as desired.

In order to hold the mattress at a suitable distance from the side of the ship, so as to prevent it from becoming jammed in the rent by reason of the water pressure, or from being caught in the wreckage, I preferably provide the side members 1 with outwardly extending arms 4, supported by suitable braces 5 and connected by a cross-piece 6. At the bottom of the members 1 is provided a similar pair of arms 7, united by a cross-piece 8, the cross-pieces 6 and 8 being adjustable, like the piece 3 and being spaced apart vertically a sufficient distance to accommodate the mattress. It will, of course, be understood that these cross-pieces may be suitably curved to conform to the shape of the hull.

In order to vertically adjust the frame and mattress as may be desired, I preferably provide the upper end of the side members 1 with rack teeth 9, and these are arranged to mesh with pinions 10, mounted on shafts 11, to each of which is secured a hand wheel 12. Each shaft 11, with its pinion and hand wheel, is journaled in an arm 13, the outer end of such arm being provided with a bi-furcated guideway 14 through which one of the members 1 passes, such guideways being equipped with hand screws 15, or the like, by means of which the member 1 may be clamped in position. The arms 13 are pivotally connected at their inner ends to the truck E. The connection shown is by means of a pin 16, journaled in lugs 17, carried by a plate 18, secured to one end of the main truck frame which, in this instance, is shown as consisting of an eye-beam 20. On its inner side, each plate 18 is provided with an extension bracket 19, for the purpose hereinafter described. The flange of the eye-beam 20 is provided with a series of holes 21, so that the plates 18 may be secured in any desired position by means of bolts 22.

The eye-beam 20 is supported at each end on an axle 23, in which are mounted a pair of wheels or rollers 24. In order to hold the arm 13 in the position shown in the drawing, a tie-bolt 25 is provided, such bolt being attached at one end to the truck and formed at its upper end with screw threads adapted to be received in a slot 27, formed on the arm 13 and equipped with a hand nut 26. In order to secure the truck and its associated parts in any desired position longitudinally of the ship, an anchor bolt 28 is provided, equipped with a screw-threaded end adapted to enter suitable sockets in the deck or be otherwise attached thereto.

The improved mattress which I propose to employ is shown in detail in Figs. 5 and 6. It consists of a canvas jacket or case 29, stuffed with some suitable fibrous material 30. Co-extensive with the pad just mentioned is a sheet of heavy woven wire 31. Superposed upon this is a flexible framework formed of a series of links or cables 32, united at their inner ends by rings 33. The outer ends of such cables or links are secured to plates 34 and 35, projecting from the corners and sides of the mattress, respectively, and provided with eyes 36. A second sheet of canvas 29ª is spread over this frame and wire and the whole is then securely united by means of bolts or rivets 37, passing through each of the eye plates and rings. This makes a flexible and at the same time very strong mattress and provides secure means for attaching the controlling cables.

Instead of mounting the truck E on the deck, or the like, as shown in Fig. 2, I may employ a modified form of truck E', as shown in Fig. 7, and mount the same to travel upon the railing B. Referring to Figs. 7 and 8, two separate trucks are employed, one for each side member 1. Each truck consists of a body 38, in which are mounted a pair of wheels 39, on spindles 40, such wheels conforming with the shape of the top of the rail. In order to hold the trucks on the rail, under-running wheels or rollers 41 are mounted in depending portions of the truck body and bear against the underside of the rail in a manner which will be well understood. The raising and lowering means heretofore described can be employed in connection with these small trucks E', such means being carried by an arm 13', pivotally mounted on the truck in a manner similar to the arm 13 in Fig. 2.

In practice, the two upper sections of the side members 1 are to remain held in the clamp guides 14. The arms 13 are normally swung into dotted line position, being supported on the brackets 19. The other sections of the frame, in assembled condition and with the mattress attached, are suitably stored in some readily accessible place. When an emergency arises, the assembled sections of the frame are raised to vertical position and coupled on to the first sections of the side members 1. When so connected, the arms 13, carrying the entire frame and mattress are swung outwardly and downwardly over the rail into the operative position shown in Fig. 1, brace cables such as 74, in Fig. 16, being employed, if desired, to steady the frame.

Referring to Fig. 1, it will be seen that controlling cables 45, 47, 49, and 51, are secured to the four corners of the mattress D, preferably by means of snap hooks engaging the eyes 36 on the corner plates 34. These cables pass around suitable pulleys 46, 48, 50, and 52, carried by the frame, and extend up to the deck, where they may be either manipulated by hand or secured to suitable winches. It will be understood that the space between the side members 1, as determined by the cross-bars 3, 6, and 8, is selected in accordance with the size of the particular mattress being used.

It will be seen that when the apparatus is first lowered into the position shown in Fig. 1, the mattress is at a considerable distance from the side of the ship, but that by means of the cables above described, it may be drawn up toward the hull and properly positioned over the rent. The frame and cables, in effect, constitute means for spacing the mattress from the hull and preventing it from being sucked into the rent by reason of the water pressure. The distance of the rent or wound below the deck determines the length of the side pieces used in assembling the frame, such side pieces, of course, being suitably curved at their lower ends, if desired, so as to conform to the profile of the hull. The final small adjustments of position are produced by means of the rack and pinion arrangement or by means of the cables.

Instead of swinging the frame outwardly over the rail, as above described, I may so mount the frame as to cause it to swing in a plane parallel with the side of the ship. This is shown in Figs. 9 and 10, and by reference to these figures it will be seen that I form the end of the arm 13' into a spindle 42, on which is rotatably mounted a sleeve 43. To this sleeve are rigidly secured triangular braces 44, constituting the upper end of a slightly modified form of frame C'. With such an arrangement, the entire frame and mattress properly assembled may be supported alongside the hull above the water-line and then, in an emergency, released so as to swing downwardly into vertical position, the final adjustment of the mattress to the proper position, as well as the bracing of the frame, being accomplished by means of the cables.

In connection with the construction shown in Fig. 1, I may make the side arms 4 and 7 adjustable, as shown in Fig. 11. To this end, the arm designated by 4' is formed with a telescopic joint 4$^a$.

Instead of the method shown in Fig. 1, for spacing the mattress from the side of the ship and preventing it from being sucked into the hole, I may employ the arrangement shown in Figs. 13 and 15. Referring to these figures, I provide a guard or shield F, somewhat in the shape of a scoop having one side and the end open and provided with a bottom 53, sides 54 and end 55. Rollers 56 may be secured to the sides of the shield to facilitate its travel along the hull. When an accident occurs, this shield is first lowered by means of suitable cables 57 into position over the rent and the mattress can then be safely lowered into position, so as to overlie the shield, as shown in Fig. 13. When the mattress has reached the proper position, the shield is withdrawn upwardly and thereupon the rush of the water through the rent X securely seats the mattress over such rent, as shown in Fig. 14.

For holding and lowering the mattress when the shield F is employed, I propose to use instead of the off-set frame shown in Fig. 1, a flat frame such as shown in Fig. 12. This frame is composed of suitable cross and side members lying in the same plane, and the mattress is also located in the plane of such members. The side members 69 are preferably rigid but the cross member may consist of a number of sections 68, connected by means of suitable couplings 68$^a$. In the arrangement shown in Fig. 12. the mattress 70 is surrounded by a rectangular frame of linkwork 58, connected at its corners by rings 60, to which controlling cables 61 are attached, such cables passing around suitable pulleys 62, where necessary. The mattress is secured to the linkwork 58 by means of short links 59, distributed through the linkwork, as will be obvious. In order to tension the mattress and shift it laterally, I connect a number of rings 60 at each side to a cross bar 63, to which is attached a cable 64. This cable passes around a pulley 65, which is itself interposed in a cable 66 and may be adjusted vertically by running such cable around a pulley 67, carried by the frame.

In some cases it may be desirable to employ the vertical members 69 alone without any cross members. In this event, such vertical members will be properly braced by suitable cables, similar to cables 74 in Fig. 16, and it will be understood that the cables such as 61, 64, and 66, are passed through or around the respective rings and pulleys prior to the frame members being lowered into the water.

In Fig. 16, I have shown another arrangement of mattress-supporting frame which I regard as preferable, when it is not desired to space the mattress from the side of the ship. Referring to Fig. 16, it will be seen that this improved frame comprises a rectangular portion formed of members 70 and 71, each of which is preferably made in sections so as to be adjustable. The members 71 extend upwardly to the supporting means and may be connected at intervals by braces or cross-pieces 72. The mattress D is mounted in the plane of the rectangular frame 70—71, and is secured directly thereto at intervals around its periphery by means of links 73. This produces a very strong and compact arrangement, and the proper positioning of the mattress relative to the hull can be secured by means of the truck, such as E and its associated raising and lowering mechanism. Bracing cables or guy wires 74, may be attached to the bottom of the frame 70—71, to steady the same, if necessary.

If it should happen that a rent made in the hull is too large to be closed by a single mattress, a plurality of mattresses, arranged in over-lapping relation, can be employed. This is diagrammatically illustrated in Fig. 17, where three mattresses, D', D$^2$, and D$^3$, are shown assembled so as to cover the rent indicated in broken lines.

In Fig. 18, I have shown an arrangement of controlling cables slightly different from that illustrated in Fig. 12. In this case, the mattress D is supported by its corners, as in Fig. 1, by means of cables 61. Where the mattress is large, however, additional supporting and tensioning means may be required. To this end, I provide the corner cables 61, with rings, to which a rectangular frame-work of cables surrounding the mattress is attached. Short cables 75 are secured to the eyes 35, at each side of the mattress. The ends of these short cables are connected as by means of snap hooks to rings 76, to which other cables 77 are secured. The short cables 75 pass freely through intermediate rings 60, carried by the cable frame-work, and one of the cables 77 also passes freely through a ring 78. It will be obvious that by pulling on the cables 77, the mattress may be tensioned and drawn tightly into the plane of the frame 68.

In Fig. 19, I have illustrated a still further modified arrangement of links and cables. In this arrangement, the mattress can be tensioned by means of a single cable 78, instead of a plurality of cables, as shown in the other figures. To this end, the short cables 75, which are connected to the side plates 35, on each side of the mattress, are all connected to the single cable 78ª, which passes through suitable guide rings 79, 80, and 81, at the corners of the link-work.

In Fig. 20, I have shown a slightly different form of mattress. In this form, the inside of the mattress next to the ship is provided with an upstanding flange or rim 81. In use, this is adapted to rest against the hull and form a watertight joint. This rim is indicated by dotted lines in Figs. 18 and 19, and in these figures the mattress is designated by the reference characters D", to distinguish it from the form of mattress shown in the other figures.

It will, of course, be understood that in the form of mattress illustrated in Fig. 20, the same reinforcing means as shown in Figs. 5 and 6 may be employed, if desired.

What I claim is:

1. In apparatus of the character described, the combination with a ship, of supporting means movable longitudinally thereof, a rigid rectangular frame carried by said supporting means, means for raising and lowering said frame relative to said supporting means, and a mattress carried by and within said frame.

2. In apparatus of the character described, the combination with a ship, of a truck movable longitudinally thereof, an arm pivoted to said truck to swing in a plane at right angles to the side of the ship, a frame secured to the end of said arm, and a mattress carried by said frame.

3. In apparatus of the character described, the combination with a ship of a truck movable longitudinally thereof, an arm pivotally mounted on said truck, and projecting beyond the side of the ship, a rigid frame secured to said arm, and a mattress carried by said frame.

4. In apparatus of the character described, the combination with a ship, of a truck movable longitudinally thereof, a rigid frame pivotally supported by said truck, and a mattress carried by said frame and adjustable thereon.

5. In apparatus of the character described, the combination with a ship, of supporting means movable longitudinally thereof, a frame secured to said supporting means, said frame having a lower off-set portion, and a mattress carried by such off-set portion.

6. In apparatus of the character described, the combination with a ship, of a pair of vertical frame members supported thereby and adapted to be positioned so as to extend parallel with and close to the side thereof, a mattress carried by said frame, and means for spacing such mattress from the side of the ship.

7. In apparatus of the character described, the combination with a ship, of a mattress adapted to be placed in position over a rent formed in the hull, means for lowering such mattress and shifting it to the proper position, and a guard adapted to be lowered into position over the rent so as to prevent the jamming of the mattress therein, said guard having side flanges adapted to bear against the hull, and an open lower end to clear the wreckage.

8. In apparatus of the character described, the combination with a ship, of a frame supported thereby, a mattress carried by said frame, said mattress being connected to the frame by means of cables and pulleys whereby the position of the mattress in the frame may be adjusted both laterally and vertically.

9. In apparatus of the character described, the combination with a ship, of a frame supported thereby, a mattress mounted within the frame, a cable system surrounding the mattress and also lying within the frame, said cable system having rings interposed therein, and other cables secured to the edge of said mattress and passing through said rings, whereby the mattress may be tensioned.

10. In apparatus of the character set forth, a mattress comprising a pad of fibrous material, and a re-enforcing universally flexible frame of linkwork co-extensive with and secured to said pad.

11. In apparatus of the character described, a mattress comprising a woven wire foundation, a re-enforcing flexible frame of link work superposed upon said woven wire, and a covering of canvas enclosing said wire and link work.

12. In apparatus of the character described, a mattress comprising a pad of fibrous material, a woven wire backing co-extensive with said pad, and a reinforcing frame of link-work superposed upon said woven wire, all of said parts being securely riveted together.

13. In apparatus of the character described, a mattress comprising a pad and a reinforcing backing formed of woven wire and link-work, and eye plates secured to said backing and projecting beyond the edges of the mattress, such eye plates being adapted to receive cables or the like for attaching the mattress to a suitable support.

14. In apparatus of the character described, a mattress comprising a universally flexible pad of fibrous material covered with canvas, and having an upstanding marginal flange extending around the periphery and having a water tight connection therewith, said flange being formed of a canvas envelope stuffed with soft material.

In testimony whereof I affix my signature.

RALPH BLUMBERG.